US012084547B2

(12) United States Patent
Courtemanche et al.

(10) Patent No.: US 12,084,547 B2
(45) Date of Patent: Sep. 10, 2024

(54) BRIDGED FRUSTRATED LEWIS PAIRS AS THERMAL TRIGGER FOR REACTIONS BETWEEN Si—H AND Si—O—Si

(71) Applicant: Dow Silicones Corporation, Midland, MI (US)

(72) Inventors: Marc-Andre Courtemanche, Midland, MI (US); Eun Sil Jang, Columbus, OH (US); Yanhu Wei, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 485 days.

(21) Appl. No.: 17/440,842

(22) PCT Filed: Jun. 2, 2020

(86) PCT No.: PCT/US2020/035637
§ 371 (c)(1),
(2) Date: Sep. 20, 2021

(87) PCT Pub. No.: WO2020/247330
PCT Pub. Date: Dec. 10, 2020

(65) Prior Publication Data
US 2022/0162392 A1 May 26, 2022

Related U.S. Application Data

(60) Provisional application No. 62/856,771, filed on Jun. 4, 2019.

(51) Int. Cl.
C08G 77/08 (2006.01)
C07F 5/02 (2006.01)
C07F 7/08 (2006.01)
C08G 77/12 (2006.01)
C08G 77/14 (2006.01)
C08K 5/18 (2006.01)
C08K 5/55 (2006.01)
C08L 83/00 (2006.01)
C08L 83/04 (2006.01)
C08L 83/06 (2006.01)

(52) U.S. Cl.
CPC ............. C08G 77/08 (2013.01); C07F 5/027 (2013.01); C08G 77/12 (2013.01); C08G 2150/00 (2013.01)

(58) Field of Classification Search
None
See application file for complete search history.

(56) References Cited

U.S. PATENT DOCUMENTS

| | | |
|---|---|---|
| 4,254,271 A | 3/1981 | Finke et al. |
| 5,721,290 A | 2/1998 | Eckberg et al. |
| 5,866,261 A | 2/1999 | Kerr, III et al. |
| 6,548,568 B1 | 4/2003 | Pinto et al. |
| 6,777,512 B1 | 8/2004 | Sonnenschein et al. |
| 7,064,173 B2 | 6/2006 | Rubinsztajn et al. |
| 7,906,605 B2 | 3/2011 | Cray et al. |
| 8,048,819 B2 | 11/2011 | Rubinsztajn et al. |
| 8,470,899 B2 | 6/2013 | Maliverney |
| 8,629,222 B2 | 1/2014 | Takizawa et al. |
| 8,968,868 B2 | 3/2015 | Yang et al. |
| 9,006,336 B2 | 4/2015 | Yang et al. |
| 9,006,357 B2 | 4/2015 | Yang et al. |
| 9,035,008 B2 | 5/2015 | Yang et al. |
| 9,624,154 B2 | 4/2017 | Blair |
| 9,856,194 B2 | 1/2018 | Fontaine et al. |
| 10,259,908 B2 | 4/2019 | Arkles et al. |
| 2003/0139287 A1* | 7/2003 | Deforth .................. C08G 77/08 502/202 |
| 2005/0136269 A1 | 6/2005 | Doehler et al. |
| 2006/0211836 A1 | 9/2006 | Rubinsztajn et al. |
| 2006/0241271 A1 | 10/2006 | Rubinsztajn et al. |
| 2006/0280957 A1 | 12/2006 | Lee et al. |
| 2006/0293172 A1 | 12/2006 | Rubinsztajn et al. |
| 2008/0281469 A1 | 11/2008 | Choi et al. |
| 2009/0192282 A1 | 7/2009 | Janvikul et al. |
| 2010/0144960 A1 | 6/2010 | Cray et al. |
| 2013/0234070 A1 | 9/2013 | Mowrer |
| 2015/0141570 A1 | 5/2015 | Buckanin et al. |
| 2016/0289388 A1 | 10/2016 | Fu et al. |
| 2019/0031932 A1 | 1/2019 | Zhang et al. |

FOREIGN PATENT DOCUMENTS

| | | |
|---|---|---|
| CA | 2894146 A1 | 6/2014 |
| CN | 1989178 A | 6/2007 |
| CN | 104877310 A | 9/2015 |
| FR | 2824835 A1 | 11/2002 |
| WO | 2008125911 A2 | 10/2008 |
| WO | 2011045605 A1 | 4/2011 |

(Continued)

OTHER PUBLICATIONS

Khalimon et al., "A Photo Lewis Acid Generator (PhLAG): Controlled Photorelease of B(C6F5)3," Journal of the American Chemical Society, vol. 134, pp. 9601-9604, and Supporting Information, pp. S1 to S35, (2012). (Year: 2012).*
Kamino, et al., "Siloxane-Triarylamine Hybrids: Discrete Room Temperature Liquid Triarylamines via the Piers-Rubinsztajn Reaction" Organic Letters, 2011, pp. 154-157, vol. 13, No. 1.
Voss, et al., "Frustrated Lewis Pair Behavior of Intermolecular Amine/B(C6F5)3 Pairs" Organometallics, 2012, pp. 2367-2378, vol. 31.
Stephan, et al., "Frustrated Lewis Pairs: Metal-free Hydrogen Activation and More" Angew. Chem. Int. Ed., 2010, pp. 46-76, vol. 49.
Berkefeld, "Tandem Frustrated Lewis Pair/Trisborane-Catalyzed Deoxygenative Hydrosilylation of Carbon Dioxide", JACS, 2010, pp. 10060-10661, vol. 132.
Brook, "New Control Over Silicone Synthesis using SiH Chemistry: The Piers-Rubinsztajn Reaction", Chem. Eur. J., 2018, pp. 8458-8469, vol. 24.

(Continued)

Primary Examiner — Randy P Gulakowski
Assistant Examiner — Ha S Nguyen
(74) Attorney, Agent, or Firm — Steve W. Mork; Catherine U. Brown

(57) ABSTRACT

A composition contains a mixture of silyl hydride, a siloxane and a Bridged Frustrated Lewis Pair and can be thermally triggered to cure.

14 Claims, No Drawings

(56) References Cited

FOREIGN PATENT DOCUMENTS

| WO | 2012060449 A1 | 5/2012 |
|---|---|---|
| WO | 2013142956 A1 | 10/2013 |
| WO | 2016097734 A1 | 6/2016 |
| WO | 2016168914 A1 | 10/2016 |
| WO | 2017100904 A1 | 6/2017 |
| WO | 2019070866 A1 | 4/2019 |
| WO | 2020247337 A1 | 12/2020 |

OTHER PUBLICATIONS

Cella, "Preparation of Polyaryloxysilanes and Polyaryloxysiloxanes by B(C6F5)3 Catalyzed Polyetherification of Dihydrosilanes and Bis-Phenols", Macromolecules, 2008, pp. 6965-6971, vol. 41.
Chojnowski, "Hydride Tranfer Ring-Opening Polymerization of a Cyclic Oligomethylhydrosiloxane. Route to a Polymer of Closed Multicyclic Structure", Macromolecules, 2012, pp. 2654-2661, vol. 45.
Chojnowski, "Oligomerization of Hydrosiloxanes in the Presence of Trisborane", Macromolecules, 2006, pp. 3802-3807, vol. 39.
Fuchise, "B(C6F5)3-Catalyzed Group Transfer Polymerization of n-Butyl Acrylate with Hydrosilane through In Situ Formation of Initiator by 1,4-Hydrosilylation of n-Butyl Acrylate", ACS Macro Lett., 2014, pp. 1015-1019, vol. 3.
Hoque, "Polysiloxanes with Periodically Distrubuted Isomeric Double-Decker Silsesquioxane in the Main Chain", Macromolecules, 2009, pp. 3309-3315, vol. 42.
Khalimon et al., "A Photo Lewis Acid Generator (PhLAG): Controlled Photorelease of B(C6F5)3", JACS, 2012, pp. 9601-9604, vol. 134.
Khalimon, "Photo Lewis acid generators: photorelease of B(C6F5)3 and applications to catalysis", Dalt. Trans., 2015, pp. 18196-18206, vol. 44.
Kim, "Metal-Free Hydrosilylation Polymerization by Borane Catalyst", Angew. Chem. Int. Ed, 2015, pp. 14805-14809, vol. 54.
Momming, "Reversible Metal-Free Carbon Dioxide Binding by Frustrated Lewis Paris", Angew. Chem. Int. Ed., 2009, pp. 6643-6646, vol. 48.
Oestreich, "A unified survey of Si—H and H—H bond activation catalysed by electron-deficient boranes", Chem. Soc. Rev., 2015, pp. 2202-2220, vol. 44.
Stephan, "Frustrated Lewis Pair Chemistry: Development and Perspectives", Angew. Chem. Int. Ed., 2015, pp. 6400-6441, vol. 54.
Stephan, "Frustrated Lewis Pairs", JACS, 2015, pp. 10018-10032, vol. 137.
Zhang, "Piers' borane-mediated hydrosilylation of epoxides and cyclic ethers", Chem. Commun., 2018, pp. 7243-7246, vol. 54.
Asenjo-Sanz et al., "Zwitterionic Polymerization of Glycidyl Monomers to Cyclic Polyethers with B(C6F5)3" The Royal Society of Chemistry, 2012 pp. 1-5.
Chakraborty et al., "Catalytic Ring-Opening Polymerization of Propylene Oxide by Organoborance and Aluminum Lewis Acids" Macromolecules, 2003, pp. 5470-5481.
Chen et al., "B(C6F5)3-Catalyzed Group Transfer Polymerization of Acrylates Using Hydrosilane: Polymerization Mechanism, Applicable Monomers, and Synthesis of Well-Defined Acrylate Polymers", Macromolecules, 2019, pp. 844-856, vol. 52.
Chojnowski et al., "Mechanism of the B(C6F5)3-Catalyzed Reaction of silyl Hydrides with Alkoxysilanes. Kinetic and Spectroscopic Studies" Organometallics, 2005, vol. 24, pp. 6077-6084.
Fawcett et al., "Rapid, Metal-Free Room Temperature Vulcanization Produces Silicone Elastomers" J. Polym. Sci. A Polym. Chem., 2013, vol. 51, pp. 644-652.
Grande, "Testing the functional tolerance of the Piers-Rubinsztajin reaction: a new strategy for functional silicones", Chem. Comm., 2010, pp. 4988-4990, vol. 46.
Herzberger et al., "Polymerization of Ethylene Oxide, Propylene Oxide, and Other Alkylene Oxides: Synthesis, Novel Polymer Architectures, and Bioconjugation" Chemical Reviews, American Chemical Society, 2016, pp. 2170-2243.
Lambert et al., "A Stable B-Silyl Carbocation", J. Am. Chem. Soc., 1996, vol. 118, pp. 7867-7868.
Lambert et al., "B-Silyl and B-Germyl Carbocations Stable at Room Temperature", J. Org. Chem., 1999, vol. 64, pp. 2729-2736.
Matsumoto et al., "One-Pot Sequence-Controlled Synthesis of Oligosiloxanes" Angew. Chem. Int. Ed. 2018, vol. 57, pp. 4637-4641.
Mitsuo, "NewHorizon of Organosilicon Chemistry", Dalt. Trans., 2010, pp. 9369-9378, vol. 39.
Oertle et al., "Hydrosilylation of tetrasubstituted Olefins" Tetrahedron Lett., 1985, vol. 26, pp. 5511-5514.
Perez et al., "Olefin Isomerization and Hydrosilylation Catalysis by Lewis Acidic Organofluorophosphonium Salts" J. Am. Chem. Soc., 2013, 135, 18308.
Piers et al., "Mechanistic Aspects of Bond Activation with Perfluoroarylboranes", Inorg. Chem., 2011, vol. 50, pp. 12252-12262.
Rubin et al., "Highly Efficient B(C6F5)3-Catalyzed Hydrosilylation of Olefins" J. Org. Chem, 2020, vol. 67, pp. 1936-1940.
Simonneau et al., "3-Silylated Cyclohexa-1,4-dienes as Precursors for Gaseous; Hydrosilanes: The B(C6F5)3-Catalyzed Transfer Hydrosilylation of; Alkenes" Angew. Chem. Int. Ed., 2013, vol. 52, pp. 11905-11907.
Song et al., "Lewis Acid-Catalyzed Regio- and Stereoselective Hyddrosiylation of Alkenes with Trialkylsilanes" Organometallics, 1999, vol. 18, pp. 3109-3115.
Yamamoto et al., "Sterochemistry of Aluminum Chloride Catalyzed Hydrosilylation of Methylcyclohexenes" Synlett, 1990, pp. 259-260.
Zhao et al., "N-Heterocyclic Carbene-Catalysed Hydrosilylation of Styryl and Propargylic Alcohols with Dihydrosilanes" Chem. Eur. J., 2011, vol. 17, pp. 9911-9914.

\* cited by examiner

BRIDGED FRUSTRATED LEWIS PAIRS AS THERMAL TRIGGER FOR REACTIONS BETWEEN Si—H AND Si—O—Si

CROSS REFERENCE TO RELATED APPLICATIONS

This application is a U.S. national stage filing under 35 U.S.C. § 371 of PCT Application No. PCT/US2020/035637 filed on 2 Jun. 2020, which claims the benefit of U.S. Provisional Patent Application No. 62/856,771 filed 4 Jun. 2019 under 35 U.S.C. § 119 (e). PCT Application No. PCT/US2020/035637 and U.S. Provisional Patent Application No. 62/856,771 are hereby incorporated by reference.

BACKGROUND OF THE INVENTION

Field of the Invention

The present invention relates to use of a bridged frustrated Lewis pair as a thermal trigger for chemical reaction between silyl hydrides and siloxanes. The bridged frustrated Lewis pair dissociates to release a Lewis acid upon heating. The Lewis acid serves as a catalyst for the chemical reaction between silyl hydrides and siloxane.

Introduction

Frustrated Lewis Pairs ("FLPs") is a term that refers to pairs of Lewis acids and Lewis bases in which steric congestion precludes the Lewis acid and Lewis base from complexing and neutralizing each other. When combined, the Lewis acids and bases of FLPs remain independent from one another rather than combine to neutralize one another. Yet, FLPs have been found to bind indirectly to one another in the form of Bridged Frustrated Lewis Pairs ("B-FLPs"), where a bridging molecule is bound to both the acid and the base of a FLP to create a complex with the bridging molecule between the Lewis acid and Lewis base. In some instances, the bridging molecule can sever to create a blocked Lewis acid and a blocked Lewis base with a portion of the bridging molecule complexed with and blocking each of the Lewis acid and Lewis base from further complexing or reacting. Hydrogen ($H_2$) is an example of a bridging molecule that severs in such a manner upon forming a B-FLP.

B-FLPs have been used to activate the bridging molecule for use in chemical reactions. For example, hydrogen ($H_2$) has been used as a bridging molecule in a B-FLP in order to activate the hydrogen for use in hydrogenation reactions (See, for example, JACS 2015, 137, 10018-10032) and carbon dioxide has been used as a bridging molecules in B-FLP in order to activate the carbon dioxide for deoxygenative hydrosilylation (See, for example, JACS 2010, 132, 10660-10661). Other molecules used as bridging molecules in a B-FLP for use in activating them for chemical reactions include nitrous oxide ($N_2O$), sulfur dioxide ($SO_2$), alkenes and alkynes. See, for example: Angew. Chem. Int. Ed. 2009, 48, 6643-6646; Angew. Chem. Int. Ed. 2015, 54, 6400-6441; and JACS 2015, 137, 10018-10032.

It would be surprising and useful to discover additional uses for B-FLPs, particularly if such uses allow control over chemical reactions other than those involving the bridging molecule.

BRIEF SUMMARY OF THE INVENTION

The present invention offers a surprising and unexpected use for B-FLPs as thermal triggers for reactions between silyl hydride (Si—H) and siloxane linkage (Si—O—Si).

Si—H and Si—O—Si have been found to undergo a rearrangement reaction in the presence of a strong Lewis acid where a silicon from the siloxane linkage become bound the hydrogen of the silyl hydride while the silicon of the silyl hydride becomes bound to the oxygen of the siloxane linkage. Surprisingly, the silyl hydride and siloxane linkage that participate in the rearrangement reaction can be on the same molecule or can be on different molecules. This rearrangement reaction tends to be rapid in the presence of a strong Lewis acid. Such a reaction can be useful for rapidly curing systems containing Si—H and siloxane linkages without requiring water or moisture. However, it requires a two-part system for storage where the Lewis acid catalyst is kept away from a combination of the silyl hydride and siloxane linkage until such time as curing is desired. It is desirable to be able to provide a shelf-stable one-component system that utilizes the rearrangement reaction that is shelf stable at 23° C., and yet that can be triggered to cure.

The present invention is a result of discovering that B-FLPs can be used in these rearrangement reaction systems as latent Lewis acid catalysts which are triggered thermally. That is, a B-FLP comprising a Lewis acid PR reaction catalyst can be mixed with a silyl hydride and siloxane linkage to form a reactive system that is shelf stable, but can be triggered to cure when heated. With sufficient heating, the Lewis acid dissociates from the B-FLP, allowing the Lewis acid to serve as an acid catalyst that initiates a rearrangement reaction between the silyl hydride and siloxane linkage.

B-FLPs have been found to be particularly efficient triggering agents because once broken they are unlikely to recombine. That means that once the Lewis acid is freed it will continue to catalyze the reaction without inhibition by reformation of the B-FLP. That is an advantage over Lewis acids inhibited with Lewis base directly because the Lewis base remains in solution and can recombine with a free Lewis acid to neutralize the Lewis acid. B-FLPs require reformation of a bridged complex between the Lewis acid and base, which is much less likely to randomly occur. This is particularly true with fugitive bridging molecules such as those that are gaseous and escape the reaction system once the B-FLP is broken. As a result, use of a B-FLP offers unprecedented control over irreversibly triggering the reaction without interference form a catalyst inhibitor because when heated sufficiently to dissociate the B-FLP, the acid catalyst is irreversibly released to catalyze the rapid rearrangement reaction.

In a first aspect, the present invention is composition comprising a mixture of silyl hydride, a siloxane, and a Bridged Frustrated Lewis Pair.

In a second aspect, the present invention is a chemical reaction process comprising the steps of: (a) providing a composition of the first aspect; and (b) heating the composition to a temperature sufficient to dissociate the Lewis acid from the Bridged Frustrated Lewis Pair.

The present invention is useful for preparing coatings, adhesives, and elastomers.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; and ISO refers to International Organization for Standardization.

Products identified by their tradename refer to the compositions available from the suppliers under those tradenames on the priority data of this application.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

The composition of the present invention comprises a mixture of siloxane, silyl hydride and a Bridged Frustrated Lewis Pair.

"Siloxane" refers to a molecule that contains at least one siloxane (Si—O—Si) linkage. Desirably, the siloxane of the present invention is a "polysiloxane", which refers to a molecule that contains multiple Si—O—Si linkages. Polysiloxanes comprise siloxane units that are typically referred to as M, D, T or Q units. Standard M units have the formula $(CH_3)_3SiO_{1/2}$. Standard D units have the formula $(CH_3)_2SiO_{2/2}$. Standard T units have the formula $(CH_3)SiO_{3/2}$. Standard Q units have the formula $SiO_{4/2}$. M-type, D-type and T-type units can have one or more methyl group replaced with hydrogen, or some other moiety.

"Silyl hydrides" are molecules that contain a silicon-hydrogen (Si—H) bond and can contain multiple Si—H bonds.

"Alkyl" is a hydrocarbon radical derived from an alkane by removal of a hydrogen atom. "Substituted alkyl" is an alkyl that has an atom, or chemical moiety, other than carbon and hydrogen in place of at least one carbon or hydrogen.

"Aryl" is a radical derived from an aromatic hydrocarbon by removal of a hydrogen atom. "Substituted aryl" is an aryl that has an atom, or chemical moiety, other than carbon and hydrogen in place of at least one carbon or hydrogen.

A "Frustrated Lewis Pair", or "FLP", is a system of Lewis acids and Lewis bases in which steric congestion precludes the Lewis acid and Lewis base from complexing and completely neutralizing ("blocking") each other. FLPs are known in the art and have been characterized in articles such as JACS 2015, 137, 10018-10032 and the articles identified therein. Desirably, the FLP is a system of Lewis acids and Lewis bases in which congestion precludes their complexing and neutralizing at 20 degrees Celsius (° C.). While FLPs are known in the art, one can determine whether any Lewis pair is a FLP by combining at 20° C. equal molar amounts of the Lewis acid and Lewis base in a solvent that dissolves both. If more than 10 molar percent of the Lewis acid and Lewis base remain dissociated then the Lewis acid and Lewis base can be considered a FLP. Determine extent of dissociation by any means reasonable such as by nuclear magnetic resonance spectroscopy or, preferably ion chromatography using conductimetric or photometric detectors.

Upon heating compositions of the present invention, the B-FLP releases Lewis acid which catalyzes a reaction between the siloxane and the silyl hydride. Heating the composition to a temperature of 80° C. or higher, 90° C. or higher, 100° C. or higher, 110° C. or higher, 120° C. or higher, 130° C. or higher, 140° C. or higher, 150° C. or higher, 160° C. or higher, 170° C. or higher, 180° C. or higher, 190° C. or higher, 200° C. or higher, 210° C. or higher and at the same time, generally 300° C. or lower, 250° C. or lower, 240° C. or lower, 230° C. or lower, 220° C. or lower, 210° C. or lower, 200° C. or lower, 175° C. or lower, 150° C. or lower, 140° C. or lower, 130° C. or lower, 120° C. or lower, 110° C. or lower, or even 100° C. or lower causes the components in the composition to react and cure in less than half the time, preferably $\frac{1}{5}^{th}$ the time or less, more preferably $\frac{1}{10}^{th}$ the time or less required to for the composition to gel at 23° C.

The Lewis acid catalyzed reaction between a siloxane and silyl hydride is a rearrangement reaction generally represented by the following reaction:

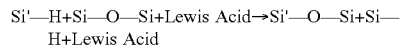

Si'—H+Si—O—Si+Lewis Acid→Si'—O—Si+Si—H+Lewis Acid

This rearrangement reaction is useful to form new siloxane bonds and to form crosslinked polysiloxane systems. A particularly desirable characteristic of this reaction over other Lewis acid catalyzed reactions such as Piers-Rubinsztajn (PR) reaction is that this reaction does not typically generate nearly as much volatile side products as the PR reaction. Volatile side products can create bubbles when the reaction is used to cure a siloxane polymer, resulting in a cloudy siloxane polymer. Hence, the reaction is ideal for making clear cured compositions and films.

The composition of the present invention is shelf stable. "Shelf stable" means that the composition does not form gel at 23° C. in 5 hours or less, preferably 24 hours or less, more preferably 48 hours or less, even more preferably one week or less.

Siloxane

Desirably, the siloxane component is a polysiloxane, containing multiple siloxane linkages. Polysiloxanes comprise multiple siloxy (SiO) groups. Siloxy containing groups are typically designated as M, D, T or Q groups. The polysiloxane can be linear and comprise only M ($\equiv SiO_{1/2}$) type and D ($=SiO_{2/2}$) type units. Alternatively, the polysiloxane can be branched and contain T ($—SiO_{3/2}$) type and/or Q ($SiO_{4/2}$) type units. Typically, M, D, T and Q units have methyl groups attached to the silicon atoms where oxygen is not attached to provide a valence of four to each silicon atom and each oxygen is attached to the silicon of another unit. Referring to these as M, D, T and Q "type" units means that groups such as those selected from a group consisting of hydrogen, alkyl, substituted alkyl, aryl, and substituted aryl groups can be bound to the silicon atoms in place of one or more methyl. For instance, $M^H$ is an M-type unit where one methyl is replaced with a hydrogen.

The polysiloxane can have a degree of polymerization (DP) of 10 or more, preferably 20 or more, more preferably 30 or more, and can be 40 or more 50 or more, 75 or more, 100 or more, 250 or more, 500 or more, 1000 or more, 2,000 or more, 4,000 or more, 6,000 or more and even 8,000 or more while at the same time is typically 10,00 or less, preferably 8,000 or less, 6,000 or less, 4,000 or less, 2,000 or less, 1,000 or less, 800 or less, 600 or less, 400 or less, 200 or less or even 100 or less. DP corresponds to the number of siloxy groups there are in the molecule and can be determined by silicon-29 nuclear magnetic resonance ($^{29}Si$ NMR) spectroscopy.

The siloxane component can contain a Si—H bond, which means it can also serve as a silyl hydride component. In fact, the siloxane component and the silyl hydride component can be the same molecule in the present invention. Alternatively, the siloxane component and the silyl hydride component can be different molecules. In fact, the siloxane molecule can be free of Si—H bonds and/or the silyl hydride component can be free of Si—O—Si linkages.

Examples of suitable siloxanes without Si—H bonds include XIAMETER™ PMX-200 Silicon Fluids available from The Dow Chemical Company.

Examples of suitable siloxanes that contain Si—H bonds include poly(methylhydrosiloxane and poly(dimethylsiloxane-co-methylhydrosiloxane), trimethylsilyl terminated, both of which are available from Sigma-Aldrich. Additional examples of suitable siloxanes that contain Si—H bonds include pentamethyldisiloxane, bis(trimethylsiloxy)methyl-silane, tetramethyldisiloxane, tetramethycyclotetrasiloxane, and hydride terminated poly(dimethylsiloxane) such as those available from Gelest under the tradenames: DMS-H03, DMS-H25, DMS-H31, and DMS-H41.

Typically, the concentration of siloxane in the composition is 70 weight-percent (wt %) or more, 75 wt % or more, 80 wt % or more, 85 wt % or more, even 90 wt % or more while at the same time is typically 90 wt % or less, 85 wt % or less, 80 wt % or less, or even 75 wt % or less based on combined weight of silyl hydride, siloxane and B-FLP in the composition.

Silyl Hydride

The silyl hydride contains one, preferably more than one, Si—H bond. The Si—H bond is typically part of polysilane (molecule containing multiple Si—H bonds) or polysiloxane. Silyl hydrides containing multiple Si—H bonds are desirable as crosslinkers in compositions of the present invention because they are capable of reacting with multiple siloxane linkages.

The silyl hydride of the present invention can be polymeric. The silyl hydride can be linear, branched or can contain a combination of linear and branched silyl hydrides. The silyl hydride can be a polysilane, a polysiloxane or a combination of polysilane and polysiloxanes.

Desirably, the silyl hydride is a polysiloxane molecule with one or more than one Si—H bond. If the silyl hydride is a polysiloxane, the Si—H bond is on the silicon atom of an M-type or D-type siloxane unit. The polysiloxane can be linear and comprise only M type and D type units. Alternatively, the polysiloxane can be branched and contain T type and/or Q type units.

Examples of suitable silyl hydrides include pentamethyl-disiloxane, bis(trimethylsiloxy)methyl-silane, tetramethyld-isiloxane, tetramethycyclotetrasiloxane, and hydride terminated poly(dimethylsiloxane) such as those available from Gelest under the tradenames: DMS-H03, DMS-H25, DMS-H31, and DMS-H41.

The concentration of silyl hydride is typically sufficient to provide a molar ratio of Si—H groups to siloxane linkages that is 0.2 or more, 0.5 or more, 0.7 or more, 0.8 or more, 0.9 or more, 1.0 or more 1.2 or more, 1.4 or more, 1.6 or more, 1.8 or more, 2.0 or more, 2.2 or more, even 2.5 or more while at the same time is typically 5.0 or less, 4.5 or less, 4.0 or less, 3.5 or less, 3.0 or less, 2.8 or less, 2.5 or less, 2.3 or less, 2.0 or less, 1.8 or less, 1.6 or less, 1.4 or less, 1.2 or less or even 1.0 or less.

Either the siloxane or the silyl hydride (or both) can serve as crosslinkers in the reaction. A crosslinker has at least two reactive groups per molecule and reacts with two different molecules through those reactive groups to cross link those molecules together. Increasing the linear length between reactive groups in a crosslinker tends to increase the flexibility in the resulting crosslinked product. In contrast, shortening the linear length between reactive groups in a crosslinker tends to reduce the flexibility of a resulting crosslinked product. Generally, to achieve a more flexible crosslinked product a linear crosslinker is desired and the length between reactive sites is selected to achieve desired flexibility. To achieve a less flexible crosslinked product, shorter linear crosslinkers or even branched crosslinkers are desirable to reduce flexibility between crosslinked molecules.

The silyl hydride can be the same molecule as the siloxane—that is, a single molecule containing both a siloxane linkage and silyl hydride functionality can serve the roll as both the silyl hydride and siloxane. Alternatively, the silyl hydride can be a different molecule from the siloxane. The silyl hydride can be free of siloxane linkages. The siloxane can be free of silyl hydride groups.

The composition (and reaction process) of the present invention can comprise more than one silyl hydride, more than one siloxane and/or more than one component that serves as both a silyl hydride and siloxane.

Typically, the concentration of silyl hydride in the composition is 5 wt % or more, 10 wt % or more, 15 wt % or more, 20 wt % or more, even 25 wt % or more while at the same time is typically 30 wt % or less, 25 wt % or less, 20 wt % or less, 15 wt % or less or even 5 wt % or less based on combined weight of silyl hydride, siloxane and B-FLP in the composition.

Bridged Frustrated Lewis Pair

The Bridged Frustrated Lewis Pair ("B-FLP") is a complex comprising a FLP wherein a Lewis acid and a Lewis base of the FLP are both bound to a bridging molecule to form a neutralized complex with the bridging molecules residing between (that is, "bridging") the Lewis acid and Lewis base. The bridging molecule can severe, such as in the case of $H_2$, with a portion of the bridging molecule blocking the Lewis acid and another portion of the bridging molecule blocking the Lewis base. Alternatively, and preferably, the bridging molecule remains intact and the B-FLP is a stable complex (at least at 23° C.) with the bridging molecule simultaneously bound to the Lewis acid of the FLP and the Lewis base of the FLP.

The Lewis acid is selected from a group consisting of aluminum alkyls, aluminum aryls, aryl boranes including triaryl borane (including substituted aryl and triaryl boranes such fluorinated aryl boranes including tris(pentafluorophenyl)borane), boron halides, aluminum halides, gallium alkyls, gallium aryls, gallium halides, silylium cations and phosphonium cations. Examples of suitable aluminum alkyls include trimethylaluminum and triethylaluminum. Examples of suitable aluminum aryls include triphenyl aluminum and tris-pentafluorophenyl aluminum. Examples of triaryl boranes include those having the following formula:

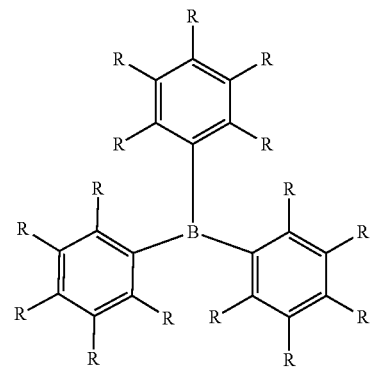

where R is independently in each occurrence selected from H, F, Cl and CF$_3$. Examples of suitable boron halides include (CH$_3$CH$_2$)$_2$BCl and boron trifluoride. Examples of suitable aluminum halides include aluminum trichloride. Examples of suitable gallium alkyls include trimethyl gallium. Examples of suitable gallium aryls include triphenyl gallium. Examples of suitable gallium halides include trichlorogallium. Examples of suitable sylyium cations include (CH$_3$CH$_2$)$_3$Si$^+$X$^-$ and Ph$_3$Si$^+$X$^-$. Examples of suitable phosphonium cations include F—P(C$_6$F$_5$)$_3$$^+$X$^-$.

The Lewis base is selected from a group consisting of the following bases: PR$_3$, P(NR$_2$)$_3$, NR$_3$, N(SiR$_3$)$_x$R$_{3-x}$, RC(NR)N, P(N—R)R$_3$, guanidines (C(=NR)(NR$_2$)$_2$), amidines (RC(=NR)NR$_2$), phosphazenes, and

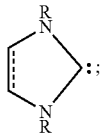

where R is in each occurrence independently selected from a group consisting of hydrogen, alkyl, substituted alkyl, aryl and substituted aryl. Examples of suitable Lewis basis of the structure PR$_3$ include tri(t-butyl)phosphine, tri(cyclohexyl) phosphine, PhP(tBu)$_2$; (cylcohexyl)P(tBu)$_2$; nBuP(tBu)$_2$; Me(tBu)$_2$; tBuP(i-Pr)$_2$; P(C$_6$H$_{11}$)$_3$; P(iBu)$_3$; and P(n-Bu)$_3$. Examples of suitable Lewis basis of the structure RC(NR)N include 1,5,7-Triazabicyclo[4.4.0]dec-5-ene; 7-Methyl-1,5,7-triazabicyclo4.4.0dec-5-ene; 2,3,4,6,7,8,9,10-Octahydropyrimidol[1,2-a]azepine, (DBU). Examples of suitable guanidines include guanidine, biguanidine, and 1,1-dimethylguanidine. Examples of suitable amidines include diethylamide, and di-isopropyl amide. Examples of suitable phosphazenes include tert-Butylimino-tri(pyrrolidino)phosphorene; tert-Octylimino-tris(dimethylamino)phosphorene; and 2-tert-butylimino-2-diethylamino-1,3-dimethylperhydro-1,3,2-diazaphosphorine. Examples of suitable Lewis basis of the structure

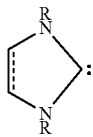

include 1,3-dimesityl-imidazol-4,5-dihydro-2-ylidene; 1,3-Bis(2,6-diisopropylphenyl)imidazol-2-ylidene; and 1,3-Bis(2,4,6-trimethylphenyl)-4,5-dihydroimidazol-2-ylidene.

The bridging molecule, in the broadest scope of the present invention, includes any molecule that will simultaneously bind and block the Lewis acid and Lewis base of a FLP to form a B-FLP. The interaction of the bridging molecule with the Lewis acid and Lewis base is such that the Lewis acid and Lewis base is blocked by the bridging molecule (or portion thereof) at 23° C. but unblocks at least the Lewis acid at temperatures of 120° C. or higher, preferably 110° C. or higher, more preferably 100° C. or higher, even more preferably 90° C. or higher, 80° C. or higher, or even 70° C. or higher and at the same time desirably 300° C. or lower, 240° C. or lower, 220° C. or lower, 200° C. or lower, 180° C. or lower, 160° C. or lower, 150° C. or lower, 125° C. or lower or even 100° C. or lower. Unblocking of the Lewis acid of the B-FLP can be evidenced by a composition of the present invention containing the B-FLP curing in less than half the time required for it to gel at 23° C.

Examples of suitable bridging molecules include carbon dioxide, hydrogen molecule (H$_2$), nitriles, alkenes, alkynes, ketones, esters and aldehydes. Desirably, the bridging molecule contains 10 or fewer, preferably 9 or fewer and can contain 8 or fewer, 7 or fewer, 6 or fewer, 5 or fewer, 4 or fewer, 3 or fewer, 2 or fewer and even one or fewer or zero carbon atoms; while at the same time the bridging molecule can contain one or more, 2 or more, 3 or more, 4 or more, 5 or more and even 6 or more carbon atoms. As noted earlier herein, some bridging molecules can sever in the B-FLP with a portion of the bridging molecule blocking the Lewis acid and a portion of the bridging molecule blocking the Lewis base. It is preferable for the bridging molecule to remain non-severed while bridging the Lewis acid and Lewis base of a FLP. In that regard, the bridging molecule preferably is not H$_2$. More preferably, the bridging molecule does not include any molecules that sever while bridging the Lewis acid and Lewis base of a FLP.

The B-FLP is desirably "stable" in the composition of the present invention, which means it does not dissociate to release Lewis acid, at temperatures of 23° C. and lower. The B-FLP can be stable at temperatures of 30° C. or lower, 50° C. or lower, 70° C. or lower, even 80° C. or lower. At the same time, the B-FLP dissociates at temperatures of 120° C. and higher, preferably 110° C. and higher, more preferably 110° C. and higher, 100° C. and higher, 90° C. and higher and even 80° C. and higher. Determine if the B-FLP dissociates by looking for evidence of free Lewis acid by nuclear magnetic resonance spectroscopy ($^1$H and $^{31}$P, $^{11}$B and/or $^{27}$Al as appropriate based on the Lewis acid). Alternatively, dissociation of the B-FLP can be detected by a composition curing faster than the identical composition without B-FLP at a given temperature.

One method for preparing the B-FLP is by combining the Lewis acid and Lewis base of a FLP together with a bridging molecule in a solvent at 23° C. Mixing facilitates formation of the B-FLP. The B-FLP can usually be isolated from the solvent by evaporating the solvent or, if the B-FLP precipitates out from the solvent then by filtration. The B-FLP can be stored for extended periods of time at 23° C. and lower. The B-FLP can be combined with a silyl hydride and a siloxane to form the composition of the present invention.

In contrast to typical blocked Lewis acid systems, the Lewis acid of the B-FLP of the present invention is complexed with a Lewis base through a bridging molecule so it is complexed with two molecules. Prior art has suggested complexing a Lewis acid directly with a blocking agent that is sensitive to ultraviolet (UV) light so upon irradiation with UV light the blocking agent dissociates from the Lewis acid. The B-FLP of the present invention does not require a UV light sensitive blocking agent and can be free of such can be free of components that cause the Lewis acid to be freed from the B-FLP upon irradiation of UV light. The B-FLP and composition of the present invention can be free of photoacid generators and can be free of any other components that upon exposure to UV radiation generates a Lewis acid.

Compositions of the present invention offer the advantage of a one-component reactive system that is shelf stable even when exposed to UV light. Unlike prior art, the composition does not require UV light to react, nor does the composition need to be blocked from exposure to UV light to remain shelf stable. Desirably, the stability of B-FLPs of the present invention do not depend on (that is, is independent from) exposure to UV light.

Compositions of the present invention typically contain enough B-FLP to provide a concentration of Lewis acid that is 0.1 weight part per million weight parts (ppm) or more, one ppm or more, 10 ppm or more, 50 ppm or more, 100 ppm or more, 200 ppm or more 300 ppm or more, 400 ppm or more, 500 ppm or more, 600 ppm or more, 700 ppm or more, 800 ppm or more, 900 ppm or more 1000 ppm or more while at the same time typically 10,000 ppm or less, 5,000 ppm or less, 1,000 ppm or less based on combined weight of silyl hydride and siloxane in the composition.

The composition of the present invention can be free of water. Alternatively, the composition of the present invention can comprise water, preferably at a concentration of one weight-percent (wt %) or less, 0.75 wt % or less, 0.5 wt % or less, 0.25 wt % or less 0.1 wt % or less, 0.05 wt % or less or even 0.01 wt % or less based on composition weight.

Optional Components

Compositions of the present invention can consist of the silyl hydride, siloxane and B-FLP. Alternatively, the compositions of the present invention can further comprise one or a combination of more than one optional component. Optional components are desirably present at a concentration of 50 wt % or less, 40 wt % or less, 30 wt % or less, 20 wt % or less, 10 wt % or less, 5 wt % or less, or even one wt % or less based on composition weight.

Examples of possible optional components include one or a combination of more than one component selected from a group consisting of hydrocarbyl solvents (typically at a concentration of 10 wt % or less, 5 wt % or less, even one wt % or less based on composition weight), pigments such as carbon black or titanium dioxide, fillers such as metal oxides including SiO2 (typically at a concentration of 50 wt % or less based on composition weight), moisture scavengers, fluorescent brighteners, stabilizers (such as antioxidants and ultraviolet stabilizers), and corrosion inhibitors. The compositions of the present invention also can be free of any one or any combination of more than one such additional components.

Notably, the composition of the present invention can contain one wt % or less, 0.5 wt % or less water relative to composition weight. Desirably, the composition is free of water.

Chemical Reaction Process

The present invention includes a chemical reaction process comprising the steps of: (a) providing a composition of the present invention; and (b) heating the composition to a temperature sufficient to dissociate the Lewis acid from the B-FLP. Upon heating the composition of the present, Lewis acid is released from the B-FLP and catalyzes a reaction between the silyl hydride and siloxane as described previously above. The composition of the present invention can be provided in step (a) by mixing together a B-FLP, a silyl hydride and a siloxane. As noted above, the silyl hydride and siloxane can be the same molecule.

The chemical reaction process can be run in an absence of water or with a concentration of water that is one weight-percent (wt %) or less, 0.75 wt % or less, 0.5 wt % or less, 0.25 wt % or less 0.1 wt % or less, 0.05 wt % or less or even 0.01 wt % or less based on weight of the composition provided in step (a).

The composition has application, for example, as coatings that undergo thermally triggered cure reactions or as reactive compositions for molding applications where a fluid is disposed within a mold and heated to trigger a cure to form a molded article. In such applications, the process of the present invention would further include a step after step (a) and prior to step (b) where the composition is applied to a substrate or placed in a mold.

Examples

Preparation of B-FLP(1)

Working in a glovebox, place in a Schlenk flask equipped with a magnetic stir bar tri(t-butyl)phosphine (200 milligrams (mg), 1.0 millimole (mmol), 1 equivalent (equiv)) and tris-pentafluorophenylborane (500 mg, 1 mmol, 1 equiv) and dissolve the components in 10 milliliters (mL) of toluene. Seal the Schlenk flask and remove from the glovebox. Connect the Schlenk flask to a Schlenk line. Stir the contents of the Schlenk flask throughout the following step. Purge the Schlenk line with nitrogen and then bubble carbon dioxide through the line for two minutes. Open the Schlenk flask to the atmosphere of carbon dioxide and then replace the cap to the flask with a septum. Insert a needle through the septum to create an exit for the carbon dioxide gas and improve carbon dioxide circulation. After 5 minutes a white solid precipitates from the reaction mixture. Seal the flask and stir at room temperature for an additional hour. Move the flask to a glovebox. Add 20 mL of hexane and isolate the white solid by filtration through a glass frit. Wash the white solid with hexane three times (10 mL each time). The white solid is B-FLP(1) (540 mg, 71% yield). B-FLP(1) can be stored without decomposition even when exposed to UV light. Characterize the solid by $^1$H, $^{31}$P and $^{11}$B nuclear magnetic resonance spectroscopy (NMR) to confirm the absence of impurities and starting materials. The expected reaction and structure of B-FLP(1) is as follows:

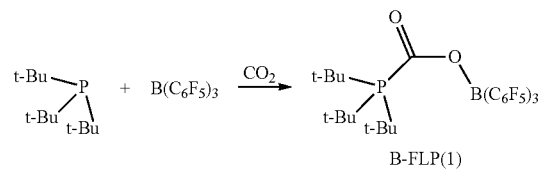

B-FLP(1)

Comparative Example (Comp Ex) A: No Lewis Acid

Into a 10 g max dental cup add 5.0 g $M^HD^H{}_8D_{20}M^H$ (available as HMS-271 from Gelest). Spin the material at 3500 revolutions per minute (rpm) for one minute in a FlackTek SpeedMixer. Pour the resulting material into an aluminum pan and heat to 100° C. on a hot plate. No bubbles were evident after 2 minutes, indicating a lack of reaction. Allow the material to set at 23° C. for 2 weeks and cure is still not evident. Comp Ex A illustrates the need for a cure catalyst to cure $M^HD^H{}_8D_{20}M^H$ either at 23° C. or 100° C.

Comp Ex B: Comp Ex A+BCF

Repeat Comp Ex A except include 0.0253 g of tris (pentafluorophenyl)borane ("BCF") per million weight parts $M^HD_{376}M^H$. Bubbles are evident upon pouring the mixture into the aluminum pan after spinning even without heating to 100° C. The mixture was left at 23° C. without heating and cured into a hard material within 2 hours at 23° C. Comp Ex B illustrates that $M^HD_{376}M^H$ cures rapidly in the presence of Lewis acid catalyst even at 23° C.

Example (Ex) 1: Comp Ex A+B-FLP(1)

Repeat Comp Ex B except use 0.253 g of B-FLP(1) instead of 0.0253 g of BCF. After the mixture was left at 23° C. for 14 days it still had not cured or shown signs of reacting. During the test, the composition are open to ambient (including ultraviolet) light. The mixture was heated to 100° C. on a hot place and within 2 minutes bubbles began forming indicating reaction was occurring. After 5 minutes on the hot plate the mixture was removed and allowed to set at 23° C. The mixture cured hard within 24 hours.

Ex 2: Mixed Reactants

Into a 10 g max dental cup add and mix 0.243 g B-FLP(1), 2.5 g of $M^HD^H{}_8D_{20}M^H$ (commercially available as HMS-271 from Gelest) and 2.5 g of $MD_{80}M$ (commercially available as XIAMETER™ 100 centistoke (cSt) PMX-200 fluid, from The Dow Chemical Company). Spin the components together at 3500 rpm for one minute in a FlackTek SpeedMixer to form a mixture. Pour the mixture into an aluminum pan and allow it to set at 23° C. After 14 days there is no sign of reaction or curing. During the test, the composition are open to ambient (including ultraviolet) light. Heat the mixture in the aluminum pan to 100° C. After 2 minutes bubbles are evident indicating reaction is occurring. After heating for 5 minutes remove the mixture and aluminum pan from the hot plate and allow to set at 23° C. The mixture cures within 48 hours.

Ex 3: Mixed Reactants

Into a 10 g max dental cup add and mix 0.243 g B-FLP(1), 2.5 g of $M^HD^H{}_8D_{20}M^H$ (commercially available as HMS-271 from Gelest) and 2.5 g of $MD_{185}M$ (commercially available as XIAMETER™ 350 cSt PMX-200 fluid, from The Dow Chemical Company). Spin the components together at 3500 rpm for one minute in a FlackTek Speed-Mixer to form a mixture. Pour the mixture into an aluminum pan and allow it to set at 23° C. After 14 days there is no sign of reaction or curing. During the test, the composition are open to ambient (including ultraviolet) light. Heat the mixture in the aluminum pan to 100° C. After 2 minutes bubbles are evident indicating reaction is occurring. After heating for 5 minutes remove the mixture and aluminum pan from the hot plate and allow to set at 23° C. The mixture cures within 36 hours.

Exs 1-3 illustrate that a B-FLP can provide a latent catalyst to a reactive system to provide a shelf stable reactive system at 23° C., but that once heated it will the Lewis acid catalyst will be released and initiate a reaction that will continue even if the mixture is allowed to cool again to 23° C.—indicative of B-FLPs providing a blocked catalyst that irreversibly unblocks upon heating.

What is claimed is:

1. A composition comprising a mixture of silyl hydride, a siloxane, and a Bridged Frustrated Lewis Pair.

2. The composition of claim 1, wherein the Bridged Frustrated Lewis Pair, wherein the Bridged Frustrated Lewis Pair is free of photoacid generators or other components that upon exposure to ultraviolet radiation generates a Lewis acid comprises:

(a) a Lewis acid selected from a group consisting of aluminum alkyls, aluminum aryls, aryl boranes, fluorinated aryl borane, boron halides, aluminum halides, gallium alkyls, gallium aryls, gallium halides, silylium cations and phosphonium cations;

(b) a Lewis base selected from a group consisting of molecules having the following structures: $PR_3$, $P(NR_2)_3$, $NR_3$, $RC(NR)N$, $P(N-R)R_3$, guanidines, amidines, phosphazenes, and

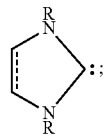

where R is in each occurrence independently selected from a group consisting of hydrogen, alkyl, substituted alkyl, aryl and substituted aryl; and (c) a bridging molecule connecting the Lewis acid and Lewis base, the bridging molecule selected from a group consisting of carbon dioxide, $H_2$, nitriles, alkenes, alkynes, ketones, esters and aldehydes.

3. The composition of claim 2, wherein the Lewis acid is a fluorinated aryl borane.

4. The composition of claim 2, wherein the Lewis base is selected from a group consisting of $PR_3$, $NR_3$, guanidines, amidines and phosphazenes.

5. The composition of claim 2, wherein the bridging molecule is selected from a group consisting of carbon dioxide, nitrile, alkynes and alkenes.

6. The composition of claim 1, wherein the Lewis acid is a fluorinated aryl borane, the Lewis base is selected from a group consisting of $PR_3$ and $NR_3$ and the bridging molecule is selected from a group consisting of carbon dioxide, alkenes, alkynes, and nitriles; where R is in each occurrence independently selected from a group consisting of hydrogen, alkyl, substituted alkyl, aryl and substituted aryl.

7. The composition of claim 1, wherein the silyl hydride and the siloxane are the same molecule.

8. A chemical reaction process comprising the steps of:
   (a) providing a composition comprising a mixture of silyl hydride, a siloxane, and a Bridged Frustrated Lewis Pair; and
   (b) heating the composition to a temperature sufficient to dissociate the Lewis acid from the Bridged Frustrated Lewis Pair, wherein the Bridged Frustrated Lewis Pair is free of photoacid generators or other components that upon exposure to ultraviolet radiation generates a Lewis acid.

9. The process of claim 8, wherein step (a) comprises mixing together a Bridged Frustrated Lewis Pair, a silyl hydride and a siloxane.

10. The process of claim 8, wherein after step (a) and prior to step (b) the composition is applied to a substrate or placed in a mold.

11. The process of claim 9, wherein after step (a) and prior to step (b) the composition is applied to a substrate or placed in a mold.

12. The composition of claim 3, wherein the Lewis base is selected from a group consisting of $PR_3$, $NR_3$, guanidines, amidines and phosphazenes.

13. The composition of claim 3, wherein the bridging molecule is selected from a group consisting of carbon dioxide, nitrile, alkynes and alkenes.

14. The composition of claim 4, wherein the bridging molecule is selected from a group consisting of carbon dioxide, nitrile, alkynes and alkenes.

\* \* \* \* \*